United States Patent [19]

Lawrence et al.

[11] Patent Number: 4,625,209
[45] Date of Patent: Nov. 25, 1986

[54] CLUTTER GENERATOR FOR USE IN RADAR EVALUATION

[75] Inventors: Gene W. Lawrence, Spokane, Wash.; Thomas L. Davis, Carrollton, Tex.

[73] Assignee: The United States of America as represented by the Secretary of the Air Force, Washington, D.C.

[21] Appl. No.: 624,846

[22] Filed: Jun. 26, 1984

[51] Int. Cl.[4] ............................................. G01S 7/40
[52] U.S. Cl. ................................................... 342/169
[58] Field of Search ............................................. 343/17.7

[56] References Cited

U.S. PATENT DOCUMENTS

| | | | |
|---|---|---|---|
| 3,365,719 | 1/1968 | Williams | 343/17.7 |
| 3,427,618 | 2/1969 | Aronoff | 343/17.7 |
| 3,732,568 | 5/1973 | O'Mary et al. | 343/17.7 |
| 3,982,244 | 9/1976 | Ward et al. | 343/16 M |
| 4,204,342 | 5/1980 | Linfield | 35/10.4 |

Primary Examiner—T. H. Tubbesing
Assistant Examiner—Donald E. Hayes, Jr.
Attorney, Agent, or Firm—Willard R. Matthews; Donald J. Singer

[57] ABSTRACT

The testing of radar systems is enhanced with the use of clutter generator that simulates realistic terrain echo returns which are provided in real-time. A fast array processor is used in combination with a Fourier Transform processor to produce a complex digital output having time, frequency and magnitude information corresponding to the composite echos from thousands of points. A digital-to-analog converter filters the output and a single-sideband mixer converts the digital output to a radio frequency signal.

2 Claims, 3 Drawing Figures

CLUTTER GENERATOR FOR USE IN RADAR EVALUATION

STATEMENT OF GOVERNMENT INTEREST

The invention described herein may be manufactured and used by or for the Government for governmental purposes without the payment of any royalty thereon.

BACKGROUND OF THE INVENTION

The invention falls into the general category of electronic testing devices; more particularly, the device simulates terrain return (clutter) for testing radar systems at RF and in real-time.

Prior to the invention, the simulations of terrain echo returns has been accomplished by devices falling in either one of two categories. The first category of prior art techniques simulates clutter effects only at low-speed or non-real-time. Providing terrain echo returns in non-real-time is not useful in testing of actual radar equipment. The radar transmitter/receiver never actually "sees" the clutter effect in actual operation: the noise of terrain echo returns is simply added to the target data at different noise levels while the system engineers speculate on the possibility of target data being obscured during actual radar operation.

The second category of prior art techniques simulates clutter effects in real-time. However, real-time clutter generators usually require simplifications, such as signals only partially representative of clutter properties and not tailored to the reflectivity of specific detailed landscapes. Thus, many tests of radar systems omit detailed clutter, leaving doubt on detection and track performance.

In view of the foregoing discussion it is apparent that there exists the need for a clutter generator that simulates terrain echo returns operating in real-time with the capability of simulating echo characteristics in realistic detail. The present invention is directed towards satisfying that need.

SUMMARY OF THE INVENTION

The present invention concerns a terrain return (clutter) generator for use in radar evaluation. A fast array processor is used in combination with a Fourier Transform processor to produce a complex digital output having time, frequency and magnitude information corresponding to the opposite echos from thousands of points. A digital-to-analog converter filters the output and a single-sideband mixer converts the digital output to a radio frequency signal.

It is a principal object of this invention to provide a clutter generator that develops terrain echo returns in realistic detail for use in testing radar systems.

It is another object of this invention to provide a clutter generator that operates in real-time to produce radio frequency (R.F.) clutter returns to the receiver of the radar system which is being evaluated.

It is another object of this invention to provide clutter generator with a frequency-modulation continuous-wave mode of operation for evaluation of radar systems which are stationary with respect to the terrain.

It is still another object of this invention to provide a clutter generator with a pulsed-doppler mode of operation for evaluation of radar systems which are in motion with respect to the terrain.

These together with other objects features and advantages of the invention will become more readily apparent from the following detailed description when taken in conjunction with the accompanying drawing wherein like elements are given like reference numerals throughout.

DETAILED DESCRIPTION OF THE PREFERRED EMBODIMENT

The present invention concerns a terrain return (clutter) generator for use in radar evaluation. A fast array processor is used in combination with a Fourier Transform processor to produce a complex digital output having time, frequency and magnitude information corresponding to the composite echos from thousands of points. A digital-to-analog converter filters the output and a single-sideband mixer converts the digital output to a radio frequency signal.

Figure 1:
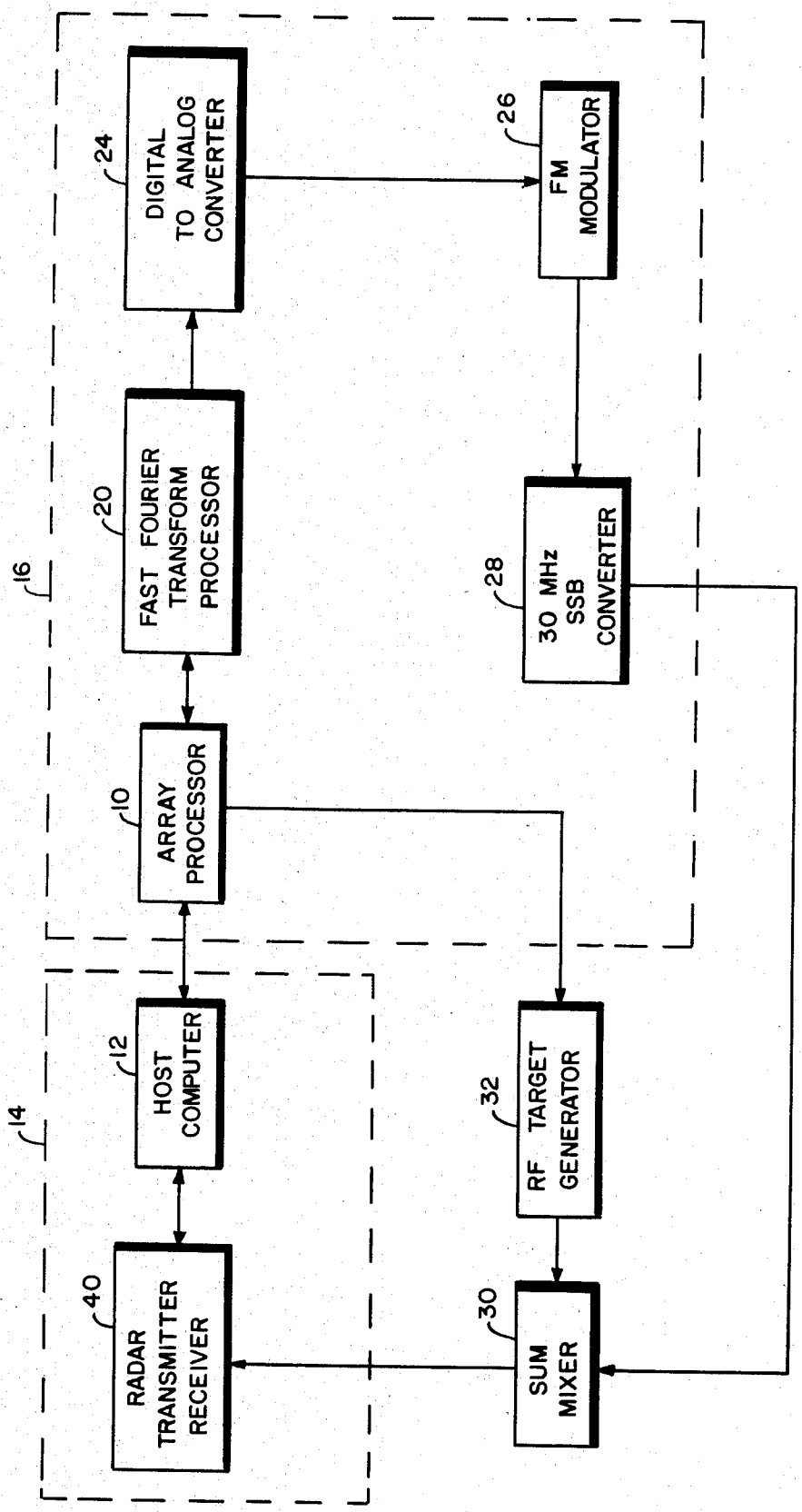
FIG. 1 is a functional block diagram of the configuration of the invention as it is used to test a radar system.

FIG. 1 is a functional block diagram of the configuration of the present invention as it is used to evaluate a radar system.

The array processor 10 interfaces with the radar data processor 12 of the radar system 14 to obtain the operating characteristics and timing used by the radar. The operating parameters obtained by the array processing include: the frequency and bandwidth of waveforms transmitted by the radar transmitter, the time to waveforms were transmitted, a system clock pulse to maintain the timing between the clutter generator 16 and the radar system 14, the antenna gain, angle of the main beam and the output power radiated by the radar.

The array processor 10 and the fast fourier transform processor 20 work together to produce a digital output consisting of: the time, frequency, and signal magnitude of terrain echo returns from a map of thousands of points which may be tailored to exhibit the r.f. reflectivity characteristics of the environment that the radar will actually be operating in.

These terrain reflectivity characteristics in this embodiment are contained in the memory of the array processor 10. By way of example in a prototype developed to prove out the invention the terrain reflectivity characteristics are defined on a map that includes 4,000 points of reflectivity per quadiant, spaced at 2 Km×0.35°.

In this embodiment the sweep time is fixed at 10 seconds per revolution; for a given range, a new point comes into view each 5.9 ms. For an isolated point, the clutter generator gives a pulse response in time similar to that of the actual antenna beam sweeping past a point.

With many points, the clutter generator provides a composite sum, varying in time just as the antenna sees echos from a collection of reflectors. The output magnitudes at the separate ranges are assigned phase incremented according to the FM slope S, range R, and filter time increment T:

$$\phi = SRT \quad (1)$$

When the clutter generator is in the Frequency-Modulator Continuous Wave (FMCW) mode of operation, the terrain echo returns correspond with those that would be observed by a radar system that is stationary with respect to the terrain. Therefore, for each point of reflectively the FFT processor produces a digital output which includes:

the time of each echo return $t = 2R/C$  (2)

where
R = distance of that echo point from the transmitter and C = the speed of light;
f = frequency of return (same as the radar frequency); and
P = the magnitude of the echo return given by the equation $$P = \sigma G(\alpha)^2 / R^4 \quad (3)$$

where $\sigma$ = reflectivity (radar cross-section) of clutter obstical $G(\alpha)$ = the antenna gain and $\alpha$ = the angle from the main beam.

With composite voltage magnitude and phase thus assigned for each range, the FFT sums the complex values at all ranges to give total complex voltage at one instant as input to the Digital to Analog Converter 22 (DAC). For this system, the DAC rate is approximately 15 KHZ, limited by the time to compute the composite filter, phase and sum of 16 ranges.

When the clutter generator is in the Pulsed Doppler (PD) mode of operation, the terrain echo returns correspond to those that would be observed by a radar system that is in motion with respect to the terrain.

The example system described here illustrates the capabilities and limits for this generator. The pulse-width transmitted is 1 us at intervals of 16 us. This received voltage is $$V_r = (\Sigma/R)(\Sigma/\alpha)I(\alpha R)G_r(\alpha_r)/R_r^2/\phi(\alpha R_1) \quad (4)$$

Receiver coordinates are updated approximately every 50 ms, from which $G_r$, $R_r$ and $\phi$ are derived.

The range of each clutter point, $R_r$, is computed using an approximation valid for a narrow sector of points. The angle off the main beam determines gain $G_r$. There are two channels with two separate receiver beam patterns, thus two voltage magnitudes associated with each point. The phase $\phi$ increases in time proportional to the relative velocity (doppler frequency) between the receiver and clutter point. The approach is to store in a buffer all points at one range, $R_t + R_r$, with the associated magnitudes and frequencies; each range corresponds to a delay for the echo pulse. As appropriate, the absolute range is converted to ambiguous range in increments of radial distance from the transmitter and in equal increments of angle around the transmitter. For the bistatic PD receiver $$P = \sigma G_r(\alpha_t) G_r(\alpha_r) / R_t^2 R_r^2 = kV^2 \quad (5)$$

Because $G_r(\alpha_r)/R_r^2$ varies dynamically during a test, we store only the constant portion for illumination voltage magnitude:

$$I = k\alpha / R_r^2 \quad (6)$$

The spacing should correspond in range to the receiver time discrimination, $T = 2R/c$. In angle there should be several points within the main beamwidth. The values of illumination stored may be, as determined by the user to represent particular terrain; the data are stored on disk and read into the processor memory during setup for a test.

In this embodiment an SPS-81 data processor was selected as the array processor (10) and an SPS-1000 was selected as the Fast Fourier Transform Processor (20). The SPS-81 and SPS-1000 were selected because of their apparent speed, combined with available memory and input/output flexibility are all necessary in generating echo returns on a real-time basis. Both processors are commercially available from Signal Processing Systems, Inc., 223 Crescent Street, Waltham, MA 02154.

The range of each clutter point, $R_r$, is computed using an approximation valid for a narrow sector of points. The angle off the main beam determines gain $G_r$. There are two channels with two separate receiver beam patterns, thus two voltage magnitudes associated with each point. The phase $\phi$ increases in time proportional to the relative velocity (doppler frequency) between the receiver and clutter point. The approach is to store in a buffer all points at one range, $R_t + R_r$, with the associated magnitudes and frequencies; each range corresponds to a delay for the echo pulse. As appropriate, the absolute range is converted to ambiguous range.

These computations for magnitude, frequency, and time delay are feasible only by limiting the "active map" points at any time to lie within the transmitter first two pair of sidelobes: 4000 points out of 98000 stored reflector points per quadrant (0.35°×150 m).

The complex magnitude and frequency comprise the complex discrete Fourier transform (DFT) for radar clutter, updated approximately every 50 mms for each separate range. Then the SPS-1000 performs a 512-point inverse FFT for each range, providing 1us echo pulses at 16 us intervals in the time domain. The SPS-1000 output buffer sequences the 16 separate FFT results, interleaved to give composite clutter echos from all ranges. This configuration is limited to approximately 4 MHZ real data rate; thus two channels of complex clutter at approximately 1 MHZ presumably the SPS-1000's parallel architecture expands to allow additional channels (e.g., four channel for full monopulse at 1 MHZ), but this was not needed in simulations.

In FIG. 1 the Fast Fourier Transform Processor (20) produces the digital output describing the time, frequency and magnitude to terrain echo return signals from thousands of points. A digital-to-analog converter (DAC) 24 converts these complex digital signals into analog clutter signals.

The DAC conversion, filtering and mixing to RF required a design feature obtain the full dynamic range and to avoid deterioration in time/frequency coherence. A 16-bit DAC for FMCW operates at a nominal 15 KHZ. Standard filtering removes harmonics due to discretization. A special balancing network adjusts the SSB converter so noise in the resulting spectrum is at least 70 DB below the maximum output level. For the PD signals, two 12-bit DACs at 1 MHZ are used; the noise level is nearly 70 DB below the maximum.

The analog clutter signals are then processed by the FM modulator 26 and converted into radio frequency analog clutter signals by a 30 MHZ single sideband converter 28.

The r.f. clutter signals produced by the clutter generator are combined 30 with the simulated target signals generated by an RF target generator 32 for reception by the radar transmitter/receiver 40.

The example systems have typical parameters which illustrate the capabilities and limits of the clutter generator. The FMCW system must trade off the number of ranges (16 in prototype) vs. DAC rate (15 KHZ). The PD system has two channels of complex output at 1 MHZ rate (150 m resolution to 50 Km).

Figure 2:
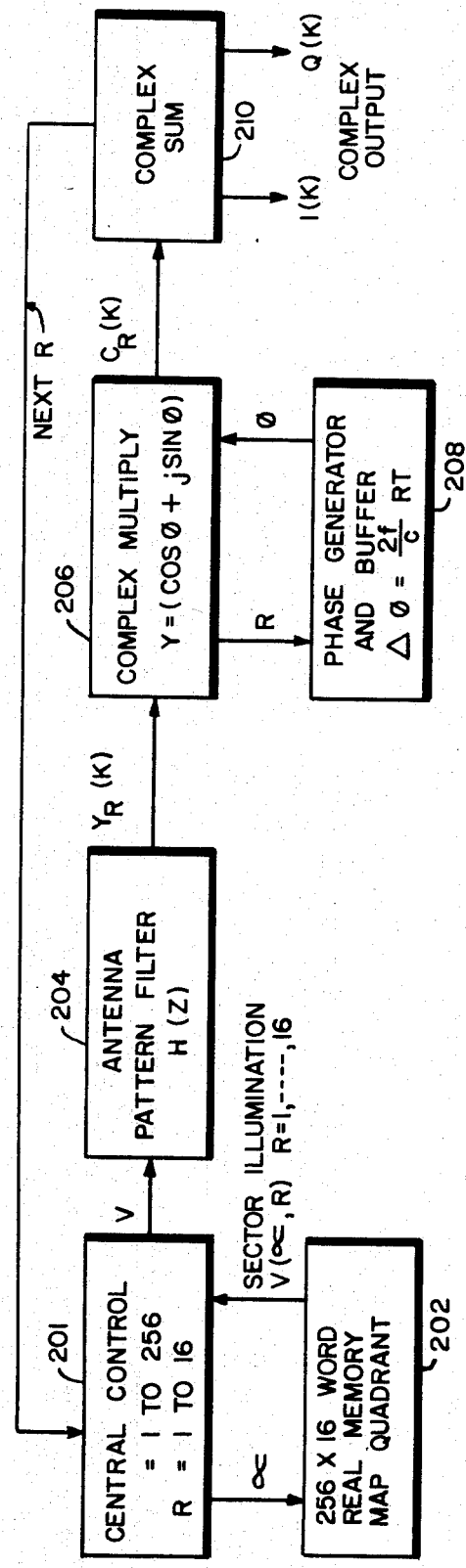
FIG. 2 is a sketch of the software functional blocks used for frequency-modulation continuous-wave clutter.

FIG. 2 is a sketch of the software functional locks which are performed by the clutter generator for frequency-modulation continuous-wave (FMCW) clutter.

The first step of clutter generation consists of defining a map at the "central control" or data input of the data processor 201. The map is defined in this embodiment by the selection of terrain echo characteristics in which up to 256 different radar cross-section (α) set at up to 16 different ranges (R) may be defined. In this particular embodiment the SPS data processor is programmed in Fortran-IV and the following program is used to load the map memory:

```
0001        DIMENSION ID(32),IAD(2), IDAT(117),
            IDAT1(234)
0002        COMMON/ACQMAP/IMAP(7168)
     C
     C      CADAPL.FTN
     C
     C      THIS PROGRAM LOADS A COMPLEX MAP
            INTO INTO SPS
     C      BULK MEMORY A (SIN X)/X ANTENNA
            PATTERN
     C      (SINXOX.DAT) IS ALSO LOAD THE DATA IS
            LOADED
     C      INTO BULK 2 (STARTS AT M1 AUDR, 40 FOR
            ALL REAL
     C      CLUTTER DATA, M1 4000,000-407,777 IS USED
            FOR
     C      COMPLEX CLUTTER DATA, M1 400,000-417,777
            IS
     C      USED. THE ANTENNA PATTERN IS ALWAYS
            LOADED INTO
     C      M1 420,000-
     C
0003        OPEN (UNIT=2, NAME= 10,10 CADATA.BOX',
            TYPE='OLD'
0004        INDEX = 1
0005        DO 20 I=1,256
0006        READ (2,10) ID
0007  10    FORMAT (32I6)
0008        DO 15 L=1,32
0009        IMAP (INDEX) = ID(L)
0010        INDEX = INDEX + 1
0011  15    CONTINUE
0012        IF ((I .LT. 23) .OR. (1 .GT. 44)) GO TO 20
0013        H = 45 - I
0014        IND = (J - 1) * 32 + 1
0015        DO 17 L=1,32
0016        IMAP(IND) = ID(L)
0017        IND = IND + 1
0018  17    CONTINUE
0019  20    CONTINUE
0020        CLOSE (UNIT=2)
0021        PI =3.1414927
0022        DO 30 I=0,58
0023        X=I
0024        OMEGA=PI/58.0*(SIN(X*PI/2.0/58.0)**15)
0025        IDAT(58+I+1)=16383.5*(1+COS(OMEGA*X))
0026        IDAT(58-I+1)=IDAT(58+I+1)
0027  30    CONTINUE
0028        K=1
0029        DO 40 I=1,234,2
0030        IDAT1(I)=IDAT(K)
0031        IDAT1(I+1)=0
0032  40    K=K+1
0033        DO 50L=1,234
0034        IMAP(INDEX) = IDAT1(L)
0035        INDEX = INDEX + 1
0036  50    CONTINUE
0037        END
```

Once the above program is run, the selected terrain characteristics form a map quandrant in the SPS bulk memory 202.

Step two occurs as the array processor 10 receives the transmitter dynamics (waveform frequency, bandwidth, and transmittal time etc.) from the host computer 12 and sends them to the Antenna Pattern filter 204. In this system the beamwidth is 1°; the map includes 4000 points per quadrant, spaced 2 km×00.35°. The sweep time is fixed at 10 seconds per revolution; for a given range, a new point comes into view each 5.9 ms. For an isolated point, the filter gives a pulse response in time similar to that of the actual antenna beam sweeping past a point.

With many points, the filter provides a composite sum, varying in time just as the antenna sees echos from a collection of reflectors. Filter output magnitudes at the separate ranges are assigned phase incremented according to the FM slope S, range R, and filter time increment T:

$$\phi = S \cdot R \cdot T \quad \text{(equation 1)}$$

Step 3 occurs as the filter output signal $Y_R(K)$ is processed by the complex multiplication 206:

$$Y \cos \phi + j \sin \phi \tag{7}$$

Simultaneously the phase of each return 0 is calculated in a Phase Generator Buffer 208 using:

$$\phi = (2F/C) \cdot R \cdot T \tag{8}$$

The final step occurs by performing a complex sum 210. With composite voltage magnitude and phase thus assigned for each range, a sum is made of the complex values at all ranges to give total complex voltage at one instant for input to the DAC. For this example system, the DAC rate is approximately 15 KHZ, limited by the time to compute the composite filter, phase and sum of 16 ranges.

In the present embodiment the following program was used to command the SPS 81 to generate clutter in continuous wave signals using Fortran IV as the computer language:

```
THIS COMMAND FILE LOADS THE SPS 81 WITH ALL
REQUIRED PROGRAMS AND OVERLAYS TO
GENERATE ACQ/TRK/MSL CLUTTER. INITIALLY, THE
EXECUTIVE IS RUNNING IN CH3 AND THE TRACK
PROGRAM WITH THE SPS 1000 SOFTWARE INTERFACE
IS RUNNING IN CH1. CH2 IS IN A WAIT FOR NEVER
STATE AND CH0 IS IN AN INFINITE LOOP.
TO START THE CLUTTER GENERATOR:
CALL SPS(DNDL,'60000)  DOWNLOADS THE SPS 1000
CALL SPS(MSRT.0)  STARTS MSL PROGRAMS CH0
IF MSL/ACQ CLUTTER ON/OFF = 1  ==  ACQ/TRK
MODE OPERATES
IF MSL/ACQ CLUTTER ON/OFF = 1
AND LAUNCH CONTROL = 1  ==  TRK/MSL MODE
OPERATES
IF MSL/ACQ CLUTTER ON/OFF = 0  ==  TRK ONLY
MODE OPERATES
PAUL GARRISON  29-OCT-82
CLEAR
SET BULK = 3
FILL M1 175400-175577=0
FILL M1 174755-174762=0
SET M1 174755=1
```

```
                -continued
SET BULK=0
@[300,24]DNDL.OVL
@[300,14]S9COVL.OVL
@[300,14]LDASC.OVL
@[300,24]ZERO.OVL
@[300,24]DIV.OVL
@[300,24]DOP.OVL
@[300,24]REQ2.OVL
@[300.24]CNDN10.OVL
@[300,24]INC.OVL
@[300,24]CLML2.OVL
@[300,24]CLMLO.OVL
@[300,24]CLMLHI.OVL
@[300,24]CLSQ.OVL
@[300,24]DMAG.OVL
@[300,24]DSQRT.OVL
@[300,24]INIT.OVL
@[300,24]ACV216.OVL
@[300,24]BAMS.OVL
@[300,24]WRP10.OVL
@[300,24]BAM7.OVL
@[300,24]QUADI.OVL
@[300,24]LDRA.OVL
@[300,24]RDHST.OVL
@[300,24]L.OVL
@[300,24]L1.OVL
@[300,24]S01.OVL
@[300,24]L.BOX
@[300,24]L1.BOX
@[300,24]MSLE.OVL
@[1,10]NIVIOP.BOX
@[1,10]DOPIOP.BOX
@[1,10]REQIOP.BOX
@[300,14]TRACK9C.BOX
@[10,14]EXE109.BOX
@[10,14]OVERLAY.BOX
@[1,10]DIV.DAT
@[1,10]REQ2.DAT
@[10,14]MSICLE.ASC
@[300,24]INITF.BOX
SET BAM1 0  =4000
SET BAM1 11 =0
SET BAM1 12 =100
FILL IOPI −  =1776
SET IOPI 3  =1440
SET IOPI 2  =240
SET IOPI 1  =226
FILL IOPA 25–26 =30000
FILL IOPA 45–46 =120
SET IOPA 63 =2
SET IOPB 3  =0
SET IOPA 07 =1
SET IOPA 67 =0
SET IOPR 11 =107417
SET IOPR 11 =077640
SET IOPR 11 =127562
SET IOPR 11 =117774
SET IOPR 63 =127500
SET IOPR 63 =117755
SAVE
RESTORE
SET IOPR 11 =067444
SET IOPR 35 =067444
TY MESS =1
*****MSLRT9E LOADED
RUN
```

Figure 3:
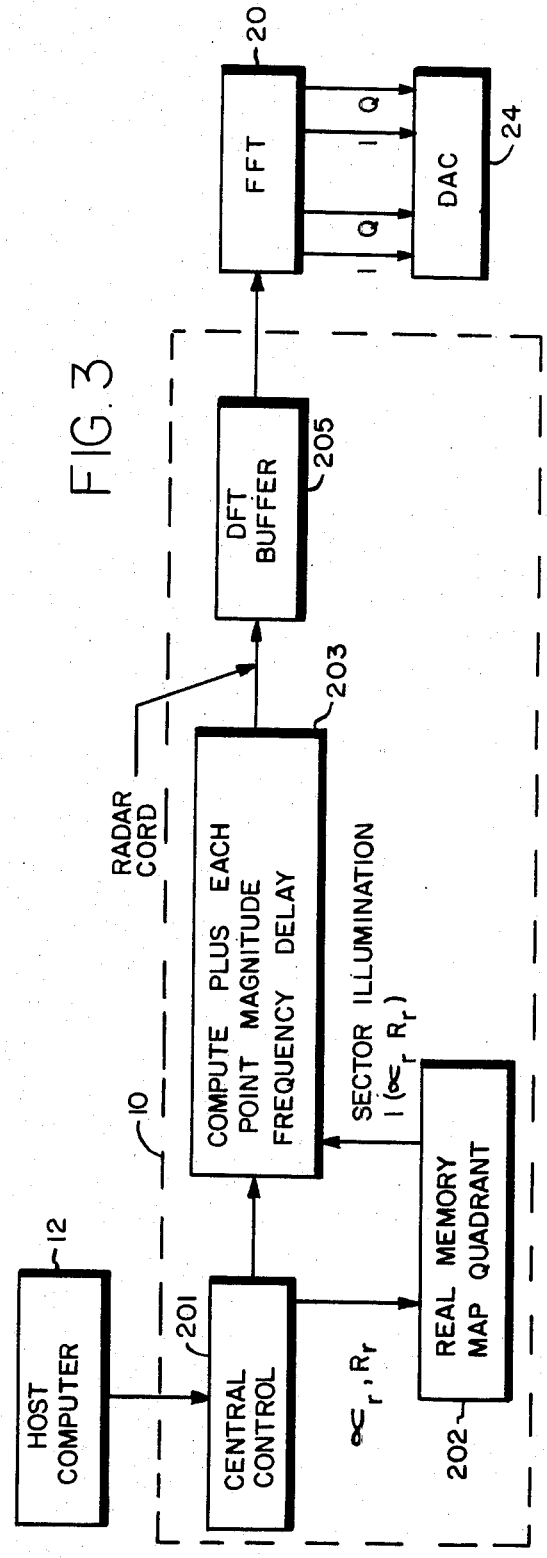
FIG. 3 illustrates the software functional blocks used for pulsed-doppler clutter.

FIG. 3 illustrates the software functional blocks which are performed by the clutter generator for pulsed doppler clutter. The array processor 10 receives the operating parameters of the radar system from the host computer 12. However, in the pulsed-doppler (PD) mode, in addition to receiving the antenna pointing direction (X,Y,Z), the array processor receives the antenna motion (X,Y,Z) since the radar is moving with respect to the terrain. In this embodiment the array processor receives a coordinate update every 50 m seconds.

Step 1 of clutter generation occurs as a terrain map is defined to central control 201. The terrain is defined in up to 256 different radar cross-sections ($\alpha$) but since the radar is moving with respect to the terrain, a larger range map is provided than was used in the FMCW mode. In PD operation up to 384 ranges may be specified for each $\alpha$ cross-section.

From central control 201 the terrain map is stored in the processor memory 202 to allow the SPS processor to respond to the operating characteristics of the host radar by computing terrain echo returns in a digital output of time, frequency and magnitude 203. For each point of range R, time=2R/C and the magnitude of signal return is expressed as defined earlier. The frequency of each signal return will be calculated to encompass the doppler shift experienced due to the motion of the radar.

In pulsed-doppler operations there are two channels with two separate receiver beam patterns, thus two voltage magnitudes associated with each point. The phase $\phi$ increases in time proportional to the relative velocity (doppler frequency) between the receiver and clutter point. The approach is to store in a buffer 205 all points at one range, $R_t + R_r$, with the associated magnitudes and frequencies; each range corresponds to a delay for the echo pulse. As appropriate, the absolute range is converted to ambiguous range.

The computations for magnitude, frequency, and time delay are feasible only by limiting the "active map" points at any time to lie within the transmitter first two pair of sidelobes: 4,000 points out of 98,000 stored reflector points per quadrant (0.35°×150 m) are used in this embodiment.

The complex magnitude and frequency comprise the complex discrete Fourier transform (DFT) for radar clutter, updated approximately every 50 ms for each separate range. The DFT is then received by the Fast Fourier Transform processor 20. In this embodiment, the SPS-1000 performs a 512-point inverse FFT for each range, providing lus echo pulses at 16 us intervals in the time domain. The SPS-1000 output buffer sequences the 16 separate FFT results, interleaved to give composite clutter echos from all ranges. The configuration is limited to approximately 4 MHZ real data rate; thus two channels of complex clutter at approximately 1 MHZ. Presumably the SPS-1000's parallel architecture expands to allow additional channels (e.g., four channel for full monopulse at 1 MHZ), but this was not needed in this embodiment.

The two set of digital output signals of the FFT 20 are then converted into analog clutter signals by the digital to analog converter 24. In this embodiment two 12 bit DACs at 1 $MH_z$ were used. In the FMCW embodiment a single 16-bit DAC was used at 15 $KH_z$.

In the present embodiment the following program was used to command the SPS-81 to generate pulsed doppler clutter signals using Fortran-IV as the computer language;

```
0001    IMPLICIT INTEGER (A-Z)
0002    DIMENSION ID9464),ID1(224),ID2(240), AURSET
        (256),BAMSET(256)
0003    DIMENSION TEMP(512),TEMPI(384)
```

-continued

```
0004        INTEGER*4 JMR,X,R,BASE,BADR
0005        REAL AB,SCALE
0006        EXTERNAL HMOV,BULK
       C
0007        TYPE *, 'ENTER 1 FOR TEST MAP DOWNLOAD'
0008        ACCEPT *,TEST
0009        BADR="177777
       C
0010        S="720
0011        LA="170000
0012        LB="20104
0013        R=65535
0014        X="21000
0015        BAM2=8192
0016        BAM3=8704
0017        BAM=BAM2
0018        INC=464
0019        Y=O
0020        C=61440
       C
0021        TYPE *,'LOADING TRACK CLUTTER MAP'
0022        JMR="21000
0023        IF (TEST.EQ.1) GOTO 250
0024        OPEN(UNIT=1,NAME=' 10,10 TDATA1.BOX',TYPE='OLD,
            1 ACCESS='DIRECT',RECORDSIZE=230
0025        GOTO 260
0026  250   OPEN(UNIT=1,NAME=' 10,10 TDATA1.TST',TYPE='OLD,
            1 ACCESS='DIRECT',RECORDSIZE=230)
0027  260   CONTINUE
       D    TYPE *,'CALL SPS (BULK,2)'
0028        CALL SPS(BULK,2)
       D    TYPE *,'CALL SPS(BULD,2) IS FINISHED'
0029        DO 10 I=1,256
0030        READ(1'I)(ID(IR),IR=1,460)
       C    DO 600 JK=1,460
       C600 ID(JK)=ID(JK)/2
0031        IF(I,NE.123) GOTO 5
0032        DO 1 J=1,224
0033  1     ID1(J)=ID(J)
0034        DO 2 J=1,240
0035  2     ID2(J)=ID(J+224)
       D    TYPE *,'CALL SPS (HMOV,ID1,JMR,1,224) - ',ID1,JMR
0036        CALL SPS(HMOV,ID1,1,JMR,1,224)
       D    TYPE *,'CALL SPS IS FINISHED'
0037        CALL SPS(BULK,3)
       D    TYPE *,'CALL SPS(BULK),3) IS FINISHED'
       D    TYPE *,'CALL SPS (HMOV,ID2,1,0,1,240) - ',ID2
0038        CALL SPS(HMOV,ID2,1,0,1,240)
       D    TYPE *,'CALL SPS IS FINISHED'
0039        JMR="360
0040        GOTO 10
0041  5     CONTINUE
       D    TYPE *,'CALL SPS AFTER STATEMENT 5',ID,JMR
0042        CALL SPS(HMOV,ID,1,JMR,1,464)
       D    TYPE *,'CALL SPS AFTER 5 IS FINISHED'
0043        JMR=JMR+"720
0044  10    CONTINUE
0045        CLOSE(UNIT=1)
       C
       C
0046        TYPE *,'LOADING TRACK MAP LOOK-UP TABLE'
0047        DO 1000 I=1,256
0048        X=X+Y
0049        IF (X,GT,R) GOTO 900
0050        BASE=((X-2*S)/128)
0051  999   A=X-128*BASE
0052        IF (A.LT.0) BASE=BASE-1
0053        IF (A.LT.0) GOTO 999
0054        A=A/2+C
0055        Q=BAM+BASE
0056        LA=A
0057        LB=Q
0058        GOTO 800
0059  900   BAM=BAM3
0060        X=X-1-R
0061        A=LA+"350
0062        Q=LB
0063  800   ADRSET(I)=A
0064        BAMSET(I)=Q
       C    TYPE 801,A,Q
0065  801   FORMAT (2010)
0066  1000  Y=INC
```

```
      C
      C     THE SIZE OF THE RV TABLE HAS BEEN INCREASED AND
      C     NOW WRIT OVER 7,734375 DEGREES OF THE TRACK MAP.
      C     TO PREVENT TRACK CLUTTER DROP-OUT IN THIS
      C     REGION, THE TRACK ADDRESS SFT BAM SET LOOK-UP
      C     TABLE (THE FIRST 22 ENTRIES-7,734375 DE HAS
      C     BEEN MODIFIED.
      C
      C     ADRSET(22)=ADRSET(23)    BAMSET(22)=BAMSET(23)
      C     ADRSET(21)=ADRSET(24)    BAMSET(21)=BAMSET(24)
      C     ADRSET(20)=ADRSET(25)    BAMSET(20)=BAMSET(25)
      C     *                        *
      C     *                        *
      C     *                        *
      C     ADRSET(1) =ADRSET(44)    BAMSET(1) +BAMSET(44)
      C
      C     P. E. GARRISON           10-NOV-82
      C
0067        J=44
0068        DO 802 I=1,22
0069        ADRSET(I)=ADRSET(J)
0070        BAMSET(I)=BAMSET(J)
0071  802   J=J−1
      C     CALL EXIT
0072        JMR="175600
0073        CALL SPS(BULK,3)
0074        CALL SPS(HMOV,ADRSET,1,JMR,1,256)
0075        JMR=JMR+"400
0076        CALL SPS(HMOV,BAMSET,1,JMR,1,256)
      C
0077        TYPE *,'LOADING MSL ANTENNA PATTERN'
0078        CALL SPS(BULK,0)
0079        OPEN (UNIT=1,
           1 NAME=' 10,10 MSL.PAT',
           2 TYPE='OLD',
           3 READONLY,
           4 ACCESS='DIRECT',
           5 RECORDSIZE=256)   ! 256 DOUBLE WORDS
      C
0080        JMR="70000
0081        DO 200 I=1,8
0082        READ(1'I)(TEMP(J),J=1,512
      C     DO 205 J=1,512
      C     AB=TEMP(J)*2
      C     AB=INT(AB/8.0)*8.0+7.0
      C205   TEMP(J)=AB
0083        CALL SPS(HMOV,TEMP,1,JMR,1,512)
0084        JMR=JMR+"1000
0085  200   CONTINUE
      C
0086        CLOSE(UNIT=1)
      C
0087        TYPE *,'LOADING MSL CLUTTER MAP'
0088        IF (TEST.EQ1) GOTO 270
0089        OPEN (UNIT=1,
           1 NAME='[10,10]MDATA1.BOX',
           2 TYPE='OLD',
           3 READONLY,
           4 ACCESS='DIRECT'
           5 RECORDSIZE=192)   ! 192 DOUBLE WORDS
0090        GOTO 280
0091  270   OPEN (UNIT=1,
           1 NAME='[10,10,]MDATA1.TST',
           2 TYPE='OLD',
           3 READONLY,
           4 ACCESS='DIRECT',
           5 RECORDSIZE=192)
0092  280   CONTINUE
      C
0093        K1=44
0094        JMR="100000
0095        DO 300 I=1,256
      C
      C     THE MSL MAP IS ALSO CHANGED TO REFLECT THE
      C     CHANGES MADE IN THE TRACK MAP.
      C
0096        K=I
0097        IF (I.GT.22) GOTO 301
0098        K=K1
0099        K1=K1−1
0100  301   READ(1'K)(TEMPI(J),J=1,384)
0101        IF (I.EQ.86) GOTO 303
```

```
-continued
0102          CALL SPS(HMOV,TEMP1,1,JMR,1,384)
0103          JMR=JMR+"600
0104          GOTO 300
0105    303   DO 305 J=1,384
0106          CALL SPS(HMOV,TEMP1(J),1,JMR,1,1)
0107          IF(JMR.EQ.BADR) GOTO 304
0108          JMR=JMR+1
0109          GOTO 305
0110    304   JMR=0
0111          CALL SPS(BULK,1)
0112          CALL SPS(BULK,1)
0113    305   CONTINUE
0114    300   CONTINUE
        C
0115          CLOSE(UNIT=1)
        C
0116          CALL SPS(BULK,0)
0117          CALL EXIT
0118          END
```

The clutter generator, as described above, dynamically responds to the operating characteristics of the host radar to produce realistic terrain echo returns in real-time for either stationary radar systems or systems which move with respect to the terrain.

While the invention has been described in its presently preferred embodiment it is understood that the words which have been used are words of description rather than words of limitation and that changes within the purview of the appended claims may be made without departing from the scope and spirit of the invention in its broader aspects.

What is claimed is:

1. A clutter generator for testing the dynamic output of a radar system comprising:

memory means, said memory means containing digital data defining discrete terrain echo characteristics, first and second signal processors being interconnected and receiving radar system dynamic operating parameter signals and clutter pattern digital data and generating therefrom complex digital signals, wherein said first signal processor performs the function of receiving the operating characteristics of said radar system and said digital data defining a discrete preselected clutter pattern from said memory means, said first signal processor generating the complex discrete Fourier transform of terrain echo returns, and said second signal processor performs an inverse Fast Fourier transform on said complex discrete Fourier transform of terrain echo returns produced by said first signal processor, said second signal processor producing real-time digital clutter signals simulating the terrain echo returns said radar system would experience from the terrain described in said memory means, digital/analog converter means converting said complex digital signals to analog clutter signals, mixer means converting said analog clutter signals to RF frequency analog clutter signals, and a balancing circuit for preprocessing the output of said digital/analog converter means for use by said mixer means.

2. A clutter generator as defined in claim 1 wherein said mixer means comprises a single sideband converter circuit.

* * * * *